SWEEP GENERATOR HAVING EXTENDED FREQUENCY BANDWIDTH

Filed March 20, 1967 5 Sheets-Sheet 1

INVENTOR.
CLAIRE R. WAINWRIGHT
BY
FOWLER, KNOBBE & MARTENS
ATTORNEYS.

INVENTOR.
CLAIRE R. WAINWRIGHT

BY
FOWLER, KNOBBE & MARTENS
ATTORNEYS.

SWEEP GENERATOR HAVING EXTENDED FREQUENCY BANDWIDTH

Filed March 20, 1967 5 Sheets-Sheet 3

INVENTOR.
CLAIRE R. WAINWRIGHT
BY
FOWLER, KNOBBE
& MARTENS.
ATTORNEYS.

June 4, 1968 C. R. WAINWRIGHT 3,387,225

SWEEP GENERATOR HAVING EXTENDED FREQUENCY BANDWIDTH

Filed March 20, 1967 5 Sheets-Sheet 4

INVENTOR.
CLAIRE R. WAINWRIGHT

BY
FOWLER, KNOBBE & MARTENS
ATTORNEYS.

SWEEP GENERATOR HAVING EXTENDED FREQUENCY BANDWIDTH

Filed March 20, 1967 5 Sheets-Sheet 5

INVENTOR.
CLAIRE R. WAINWRIGHT
BY
FOWLER, KNOBBE & MARTENS
ATTORNEYS.

United States Patent Office 3,387,225

Patented June 4, 1968

3,387,225

SWEEP GENERATOR HAVING EXTENDED FREQUENCY BANDWIDTH

Claire R. Wainwright, South Laguna, Calif., assignor to Telonic Industries, Inc., a corporation of Indiana Filed Mar. 20, 1967, Ser. No. 624,579
25 Claims. (Cl. 331—49)

ABSTRACT OF THE DISCLOSURE

A sweep generator having an extended frequency bandwidth $\Delta f$ in which plural oscillators are sequentially supplied with a time varying input waveform and synchronously coupled in sequence to an output terminal. Each of the plural oscillators is operable over a predetermined frequency bandwidth $\Delta f_1, \Delta f_2 \ldots \Delta f_n$ and the sum of these respective bandwidths covers the extended sweep bandwidth $\Delta f$.

BACKGROUND OF THE INVENTION

*Field of the Invention*

This invention relates to improvements in cyclic frequency sweeping apparatus, commonly known in the art as sweep generators.

*Description of the Prior Art*

Sweep generators provide an effective means for displaying the frequency pass band of a device under test. Basically the sweep generator comprises an oscillator whose oscillatory frequency varies in accordance with a time varying waveform so as to supply a constant amplitude, frequency modulated waveform which repetitively sweeps between a first frequency $f_1$ and a second frequency $f_2$. This signal is supplied to the device under test and its output is observed on an oscilloscope display synchronized with the input waveform of the sweep generator. Contemporary sweep generators are limited in sweep width to the maximum range of its variable oscillator. Current state of the art oscillators in the higher frequency ranges have a maximum range of about one octave. Although this range is sufficient for testing a number of electrical components and systems, there are other components, particularly in the microwave region, which have a broader bandwidth than one octave. Heretofore, it has been necessary to observe the pass band of such devices in a piecemeal fashion, using first one oscillator, then physically uncoupling this oscillator and substituting a higher frequency oscillator—there being no means available for providing a continuous display of a multi-octave pass band.

*Summary of the invention*

The present invention is a sweep generator having an extended sweep width, i.e., one in which the output signal can vary in frequency over a frequency range which is not limited to the range of any single oscillator. This is accomplished by providing a plurality of variable oscillators, each operable over respective bandwidths of $\Delta f_1$, $\Delta f_2 \ldots \Delta f_n$ where the sum of these respective bandwidths covers the extended sweep bandwidth $\Delta f$ with the lower limit $f_1$ being encompassed by the lowest frequency oscillator and the upper limit $f_2$ being encompassed by the highest frequency oscillator. A drive processing and crossover switch control means combines the outputs of these respective oscillators, one at a time and in proper time sequence so as to form a continuous sweep generator output signal extending between frequency $f_1$ and frequency $f_2$. A sweep generator effectively covering several octaves is provided in this manner, a specific embodiment being described in this application having a minimum sweep frequency of 0 and a maximum sweep frequency of 1500 MHz.

The broad sweep bandwidth provided by this invention is particularly useful for testing broad band microwave components such as directional couplers, hybrid junctions, and broad band passive and active filters. These devices typically have a range greater than one octave and their entire pass band may be effectively displayed on an oscilloscope with the present invention.

Another feature of the invention is that it is useful also for general application since the output signal may be limited to any desired portion of the extended sweep width. Thus, instruments constructed in accordance with this invention may be very conveniently used to test components which individually have a narrow bandwidth but whose center frequencies cover a wide range of frequencies. The utility of the instrument is further enhanced when operating in these narrower ranges by retaining a single one of the oscillators coupled to the system output when a narrow frequency bandwidth is selected at one of the transition frequencies. Accordingly, narrow band measurements may be made at the transition frequency without causing a pair of oscillators to be switched on and off during each trace interval.

Another advantage of the present invention is a simplified operator control whereby the minimum and maximum frequencies $f_1$ and $f_2$ may be selected by a pair of control knobs or the center frequency $f_c$ and sweep bandwidth $\Delta f$ may be selected by these same control knobs.

DETAILED DESCRIPTION OF THE PREFERRED EMBODIMENTS

Figure 1:
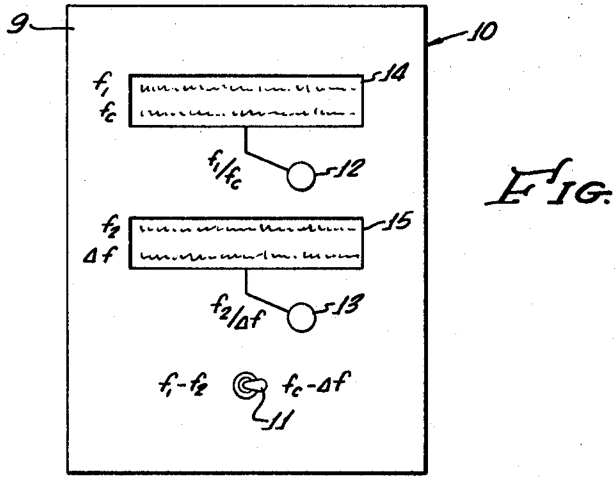
FIG. 1 is an elevation view of the front panel of a sweep generator having an extended frequency constructed in accordance with the present invention.

Referring to FIG. 1, there is shown a front panel 9 of a sweep generator 10 having an extended sweep width. The operator controls include a toggle switch 11, adjustable knobs 12 and 13 and a first and second display 14 and 15. The upper display includes two rows of indicia respectively corresponding to the lower frequency limit $f_1$ and the sweep width center frequency $f_c$. The lower display includes two rows of indicia corresponding to the upper frequency limit $f_2$ and the sweep width bandwidth $\Delta f$.

When the toggle switch 11 is thrown to its left hand position, knob 12 and the upper scale of display 14 select the lower frequency limit $f_1$ of the sweep generator output and the lower knob 13 and associated upper scale of display 15 select the upper frequency limit $f_2$ of the sweep generator. When the toggle switch 11 is thrown to the right, as shown, knob 12 and the lower scale of display 14 select the center frequency $f_c$ of the output of the sweep generator and the knob 13 and associated lower scale of display 15 selects the sweep width $\Delta f$. In this latter mode of operation, the lower and upper limits $f_1$ and $f_2$ are fixed by the following relationship:

$$f_2 - f_1 = \Delta f \quad (1)$$

$$\frac{f_1+f_2}{2} = f_c \quad (2)$$

The sweep generator 10 produces at its output a constant amplitude, frequency modulated signal which varies in frequency with time between the lower frequency limit $f_1$ and the upper frequency limit $f_2$. As described above, the present invention provides a maximum sweep width substantially in excess of the sweep width of a single voltage controlled oscillator. By way of specific example, the embodiment described hereinafter provides a bandwidth of some 1500 MHz whereas the voltage controlled oscillator is typically limited to a maximum range of 500 to 700 MHz.

Figure 2:
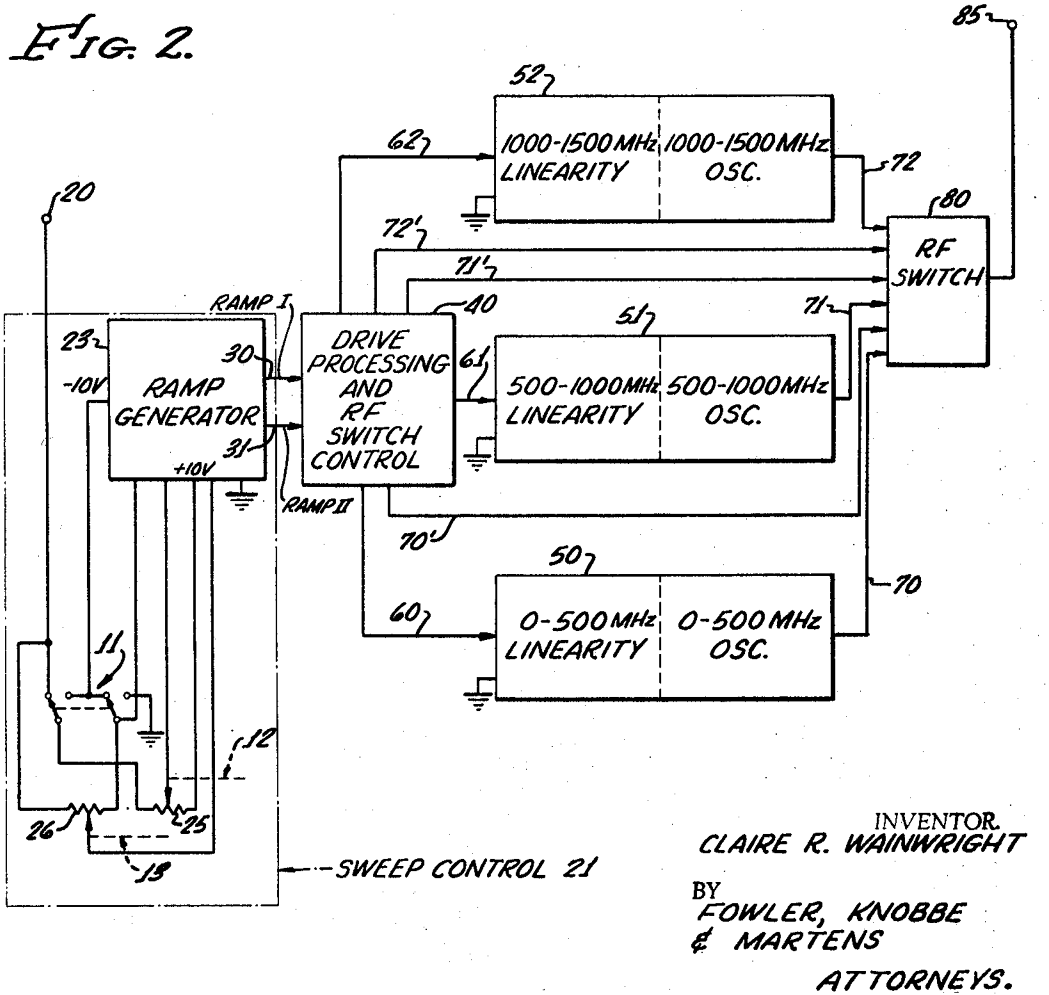
FIG. 2 is a block diagram of a sweep generator having an extended sweep constructed in accordance with this invention.

In the block diagram of the invention of FIG. 2, a time varying waveform is introduced at input 20 of the sweep control means 21. Typically, this time varying waveform comprises a linear ramp as shown at 22 in FIG. 3*a*, having a potential of −10 volts corresponding with a frequency output of 0 MHz and a potential of +10 volts corresponding to a frequency output of 1500 MHz. The blanking interval (during which time the electronic beam of the oscilloscope retraces) is provided during the second half cycle of each ramp. All, or a selected portion, of this ramp is provided the ramp generator part 23 of the sweep control by means of the double pole-double throw toggle switch 11 and a pair of potentiometers 25, 26 respectively coupled to the control knobs 12 and 13 on the front panel of the sweep generator as shown in FIG. 1. When the toggle switch is thrown to its left hand position, the first potentiometer 25 is connected between the input ramp and a +10 volt potential and the second potentiometer 26 is connected between the input ramp and a −10 volt potential. Accordingly, the position of potentiometer 25 controls the minimum potential level supplied to the ramp generator 23 and thus provides a means for selecting the minimum frequency $f_1$. Similarly, the second potentiometer 26 provides a means for setting the maximum potential and thus setting the maximum frequency $f_2$. When the toggle switch is thrown to its right hand position, the first potentiometer 25 is connected between the +10 and −10 volt busses so as to provide a fixed DC level for presetting a direct current voltage level into the ramp generator 23. This direct current voltage level sets the midsweep frequency $f_c$ of the sweep generator. The other potentiometer 26 is then connected between the input ramp signal and ground. This latter potentiometer then serves as a voltage divider for providing a preselected portion of the input ramp to the input of the ramp generator. Accordingly, this potentiometer then serves to vary the sweep width $\Delta f$.

The output waveforms from the ramp generator 23 on respective output leads 30, 31 are shown in FIGS. 3*b* and 3*c* and comprise a first linear output ramp I and a second linear output ramp II. These waveforms are shown with the controls set at the minimum frequency of $f_1$ and the maximum frequency of $f_2$ so that the maximum sweep width is provided at the output of the sweep generator. Typically, output ramp I linearly decreases from −14 volts to −23 volts whereas ramp II is its mirror image and linearly increases from +14 volts to +23 volts. As the front panel controls 12 and 13 are changed to modify the slope and level of the ramp input to ramp generator 23, these output ramps I and II also change in slope and level to provide the selected upper and lower frequency limits or the selected bandwidth and center frequency.

The ramps I and II are supplied to the drive processing and crossover switch control stage 40 over the respective leads 30 and 31. The output of the drive processing and crossover switch control stage is connected to a series of voltage controlled oscillators 50, 51 and 52 by respective pairs of output leads 60, 61 and 62. Although three oscillators are shown, a plurality of oscillators from two to a predetermined greater number may be used in accordance with the present invention to provide an extended sweep width. Each of the oscillators is operable over a predetermined bandwidth $\Delta f_1$, $\Delta f_2$ . . . $\Delta f_n$ where the sum of these respective bandwidths covers the extended sweep bandwidth $\Delta f$, with the lower limit $f_1$ being encompassed by the lowest frequency oscillator and the upper limit $f_2$ being encompassed by the highest frequency oscillator. In the specific example shown, the first oscillator 50 has a normal sweep width of 0–500 MHz, the second oscillator 51 has a normal sweep width of 500–1000 MHz and the third oscillator 32 has a normal sweep width of 1000–15000 MHz, thus encompassing the extended sweep bandwidth $\Delta f$ of 1500 MHz.

Each of the oscillators 50, 51 and 52 has a frequency output in accordance with the voltage magnitude supplied at their respective inputs. A commonly used voltage controlled oscillator (VCO) employs a varactor, a device whose capacitance varies in accordance with the voltage applied thereto. Also, voltage controlled oscillators are available in which the magnitude of the tuning inductance is varied in accordance with a voltage input. For higher frequencies, the backward wave oscillator is advantageously employed. Each type of oscillator, however, produces a limited range of frequencies. Typically, a voltage controlled oscillator will cover a 2:1 range such as 500 MHz to 1000 MHz.

A characteristic of most voltage controlled oscillators is that their output frequency varies as a non-linear function with input voltage. In the varactor type VCO, for example, this non-linearity is due primarily to two causes, the first being that the varactor does not vary linearly in capacitance with applied voltage and the second being that the oscillator output frequency does not vary linearly with changes in capacitance. The combination of these two non-linearities provides an oscillator which varies in frequency roughly exponentially with applied voltage. It is well known in the art to compensate for this non-linearity by providing a linearity stage in conjunction with the oscillator so that, for example, a linear waveform applied to the input of the oscillator is modified within the linearity circuitry for driving the oscillator and producing a linearly varying frequency at its output. Accordingly, in the embodiment shown in FIG. 2, each of the oscillators 50, 51, 52 includes a linearity stage in combination with the oscillator proper.

The respective outputs of each of these oscillators is connected to a radio frequency (RF) switch 80 by respective output leads 70, 71 and 72. These output leads also advantageously carry switching information on output leads 70', 71' and 72' of the switch control portion of stage 40 so only a selected one of the oscillators is connected to the sweep generator output terminal 85 at any given instant of time.

Figure 3:
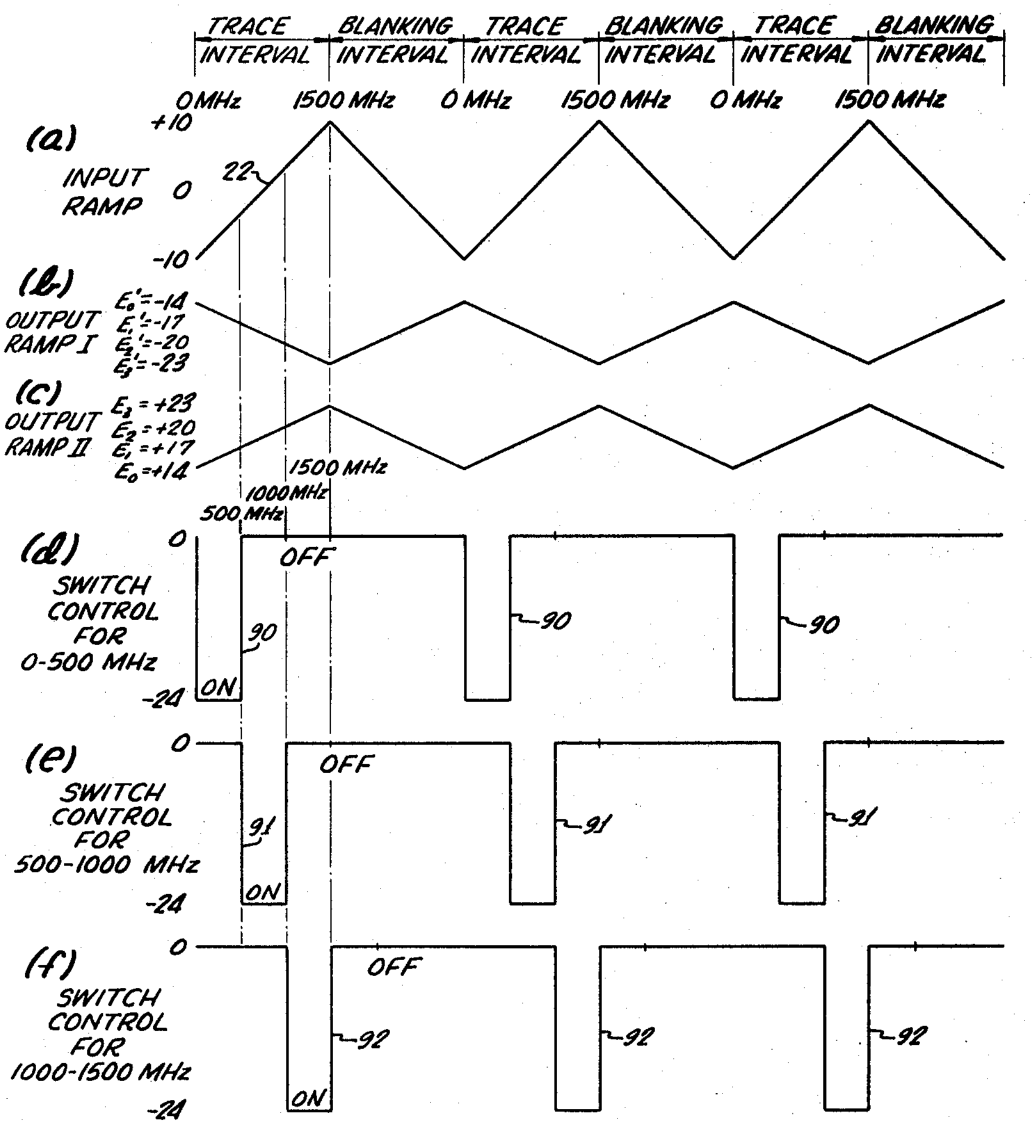
FIGS. 3*a, b, c, d, e* and *f* illustrate waveforms at various points in the system of FIG. 2 for sequentially switching the plural oscillators.
Figure 4:
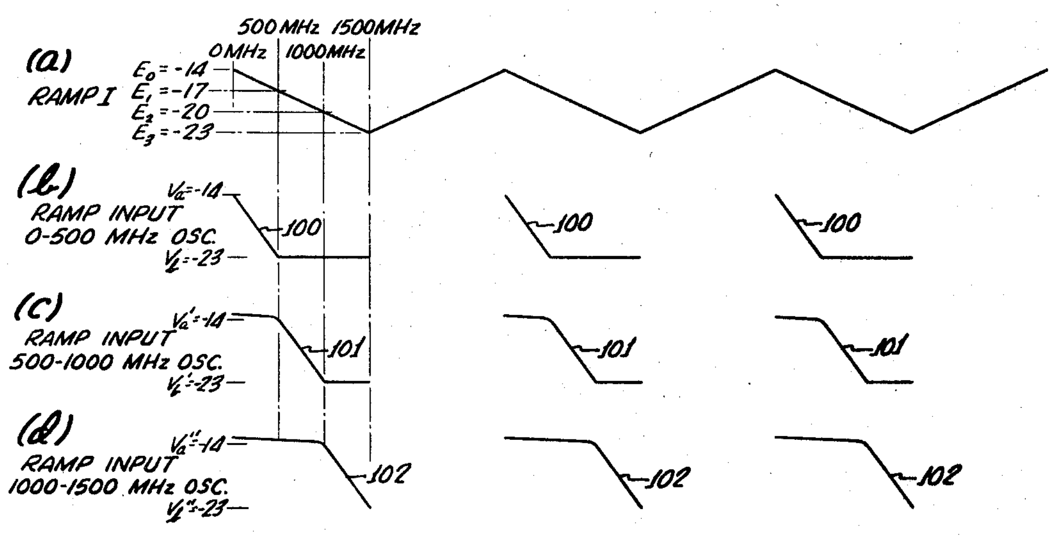
FIGS. 4*a, b, c* and *d* illustrate waveforms in the system of FIG. 2 for driving the plural oscillators in sequence.
Figure 5:
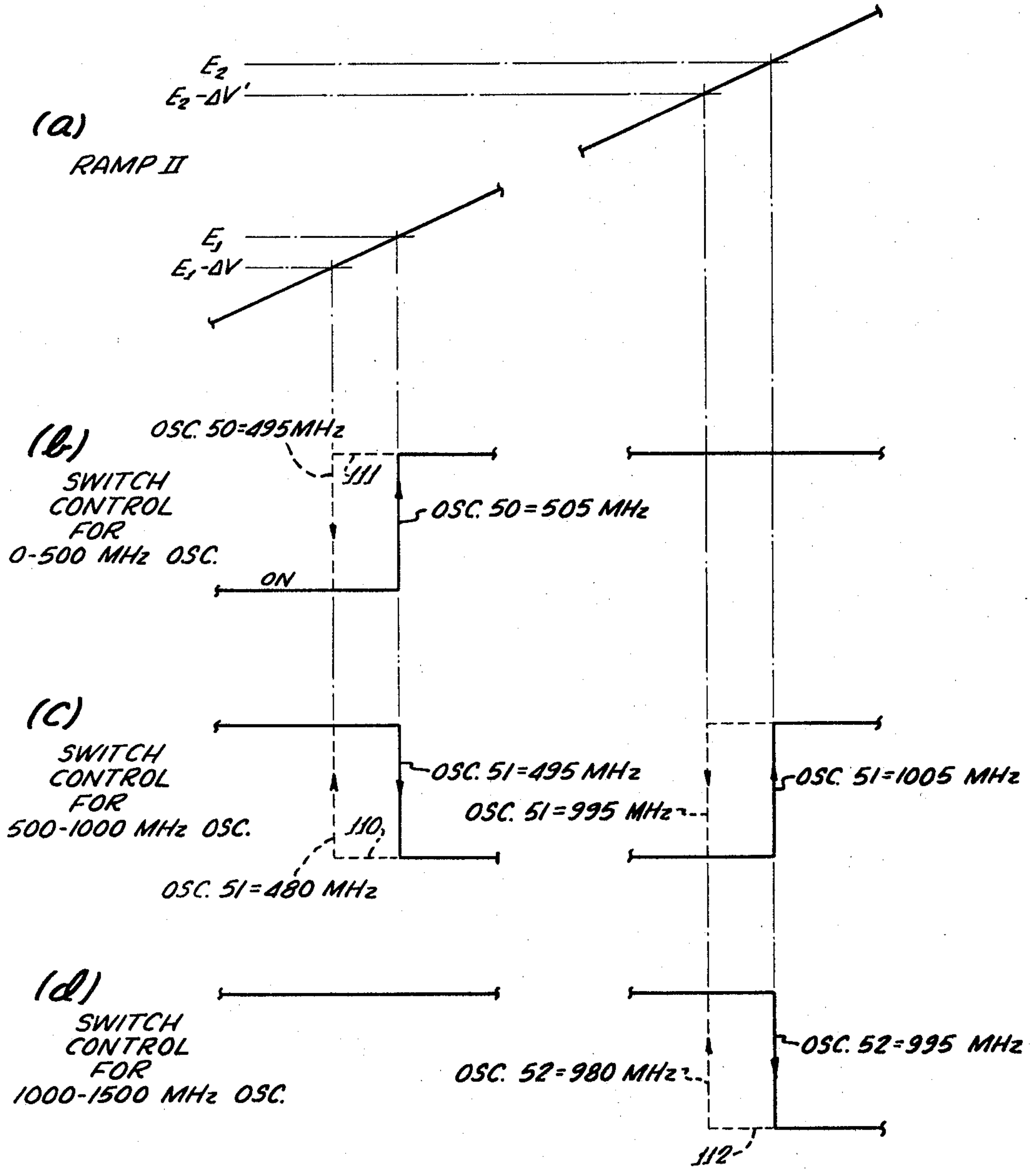
FIGS. 5*a, b, c* and *d* are waveforms illustrating the operation of the switch means which retains an oscillator over a predetermined band of frequencies beyond its normal frequency limit.

The output waveforms from the drive processing and crossover switch control stage 40 are illustrated in FIGS. 3, 4 and 5.

The output ramp II shown in FIG. 3*c*, when applied to the crossover switch portion of stage 40, produces a plurality of time spaced switch control signals 90, 91 and 92, respectively shown in FIGS. 3*d*, 3*e* and 3*f*. Signal 90 is maintained between ramp level $E_0$ of +14 volts and intermediate ramp level $E_1$ of +17 volts. Time spaced switch control signals 91 and 92 are produced between respective levels $E_1$–$E_2$ and $E_2$–$E_3$. These switch control waveforms each comprise a negative 24 volts level which opens a selected one of the radio frequency paths in the RF switch 80 and a ground potential lead which closes this RF path. As shown, at any one time, only one of the three leads 70', 71' and 72' is provided with —24 volts so that the output of only one of the oscillators is connected to the output terminal 85 at any selected time during the trace interval. Switch 80 is thereby controlled to couple the oscillator outputs to terminal 85 in synchronism with the oscillator driver signals produced by ramp I.

Output ramp I shown in FIG. 3*b* and FIG. 4*a*, when applied to the drive processing portion of stage 40, sequentially produces a plurality of ramp signals linearly varying with time between first and second signal limits $V_a$ and $V_b$, with each signal being successively initiated at its first limit when the immediately preceding signal reaches its second limit. In the embodiment of FIG. 2, this plurality of signals comprises signals 100, 101 and 102 shown in FIGS. 4*b*, *c* and *d*, each having the same first limit $V_a$ of —14 volts and the same second limit $V_b$ of —23 volts. The first ramp 100 is produced when ramp I is between its outer limit $E_o'$ and first intermediate limit $E_1'$, respectively —14 volts and —17 volts in the embodiment shown. When —14 volts is applied to the linearity stage of oscillator 50, its output is 0 Hz. This linearity stage translates ramp 100 into a non-linear waveform of suitable contour for producing a frequency output from oscillator 50 which increases linearly with time to 500 MHz. Ramp I is then at its first intermediate level $E_1'$ and ramp 100 is at its second limit of —23 volts. Similarly, the second and third waveforms 101 and 102 are applied to the linearity stages of the respective 500–1000 MHz and 1000–1500 MHz oscillators 51 and 52 coincident with the time interval that these oscillators are connected to the output terminal 85. Thus, the second oscillator 51 supplies a signal to output 85 which linearly increases from 500 to 1000 MHz, the latter output frequency coinciding until the second intermediate level $E_2'$ of ramp I. The third oscillator 52 supplies a signal to output 85 which linearly increases from 1000 to 1500 MHz. This latter frequency coincides with the other outer limit $E_4'$ of ramp I, at which level the trace interval terminates and the blanking interval is initiated.

Accordingly, it will be seen that a signal whose frequency continuously varies in time over a sweep range considerably wider than any one of the single oscillators 50–52 is applied to output terminal 85 of the sweep generator.

A significant advantage of the invention is that its performance characteristics, such as percent deviation from a predetermined constant amplitude and linearity of frequency modulation, are essentially the same as the characteristics of the individual oscillators in their respective frequency ranges.

In the preferred embodiment of the invention, a few frequencies are repeated at the switching points by tuning the oscillators so that they each cover a slightly broader sweep width so that adjacent ones of the frequency ranges overlap. Thus, the first oscillator 50 advantageously oscillates at 505 MHz instead of 500 MHz when its input drive ramp 100 reaches its second limit of —23 volts; the second oscillator advantageously produces a frequency output of 495 MHz when its driving ramp 101 is at its first limit of —14 volts and a frequency output of 1005 MHz when its ramp 101 is at its second limit of —23 volts; and the third oscillator advantageously produces a frequency output of 995 MHz when its driving ramp 102 is at its first limit of —14 volts. This frequency overlap is provided to insure that a continuous range of frequencies is applied to the sweep generator output 85. This overlap thus compensates for the effects of temperature and aging on the oscillators 50–52 which could cause a shift in their output frequency range.

When the sweep generator is being used over its full or substantialy full sweep width, this small range of frequency overlap does not substantially affect the oscilloscope display. However, when a narrow sweep bandwidth is selected by the front panel manual controls 12, 13 which includes one of the transition frequencies, i.e., 500 or 1000 MHz, a double display of possibly a substantial portion of the frequency response characteristic of the device under test may be produced on the oscilloscope. This problem is substantially minimized in the preferred embodiment of the present invention by incorporating in the switch control portion of stage 40, means for retaining one of the oscillators coupled to the output terminal 85 to provide a predetermined range of frequencies extending beyond its normal frequency range when one end of the selected sweep width does not extend beyond this predetermined range of frequencies.

Waveforms illustrating this operation are shown in FIGS. 5*a*, *b* and *c*, these waveforms being enlarged segments of the switch control signals at the respective transition frequencies of 500 and 1000 MHz. In the example illustrated in this figure, it is assumed that there is a 10-megacycle overlap between respective ones of the oscillators 50–52. Thus, at the intermediate ramp level $E_1$, the first oscillator 50 is switched off after having reached 505 MHz and the second oscillator 51 is switched on with an initial signal frequency of 495 MHz. The second oscillator, however, is capable of producing a linear range of the output frequencies extending down to 480 MHz corresponding to the change in ramp II between level $E_1$ and level $E_1$–ΔV. Accordingly, its associated drive ramp 101 is designed to initiate its linear slope at a corresponding voltage offset from intermediate level $E_1'$. When the lower end of $f_1$ of the sweep width is selected so as to fall within this range of frequencies by appropriate selection on the front panel controls 12, 13, the second oscillator 51 is retained coupled to the system output terminal 85 as indicated by the dashed line 110 and the first oscillator remains uncoupled from the terminal 85 as indicated by the dashed line 111. This means, for example, that if a sweep width having a lower frequency $f_1$ of 480 MHz and an upper frequency limit of $f_2$ of 500 MHz is selected by the front panel controls 12, 13, the second oscillator 51 is retained on during the entire trace interval, thus obviating the frequency overlap which would otherwise be introduced as the sweep passes through the normal transition point of 500 MHz during each trace interval.

Similarly, the third oscillator 52 is capable of linear operation down to 980 MHz corresponding to the offset voltage level $E_2$–ΔV'. Accordingly, its associated drive ramp 102 is designated to initiate its linear slope at a corresponding voltage offset from intermediate level $E_2'$. The switching means then retains the third oscillator 52 coupled to the terminal 85 over a predetermined range of frequencies extending down to 980 MHz when the lower end $f_1$ of the sweep width is selected to fall within this range of frequencies, as indicated at 112 in FIG. 5*d*. Any frequency range whose lower limit $f_1$ is equal to or higher than 980 MHz will be thus produced solely by the third oscillator.

Figure 6:
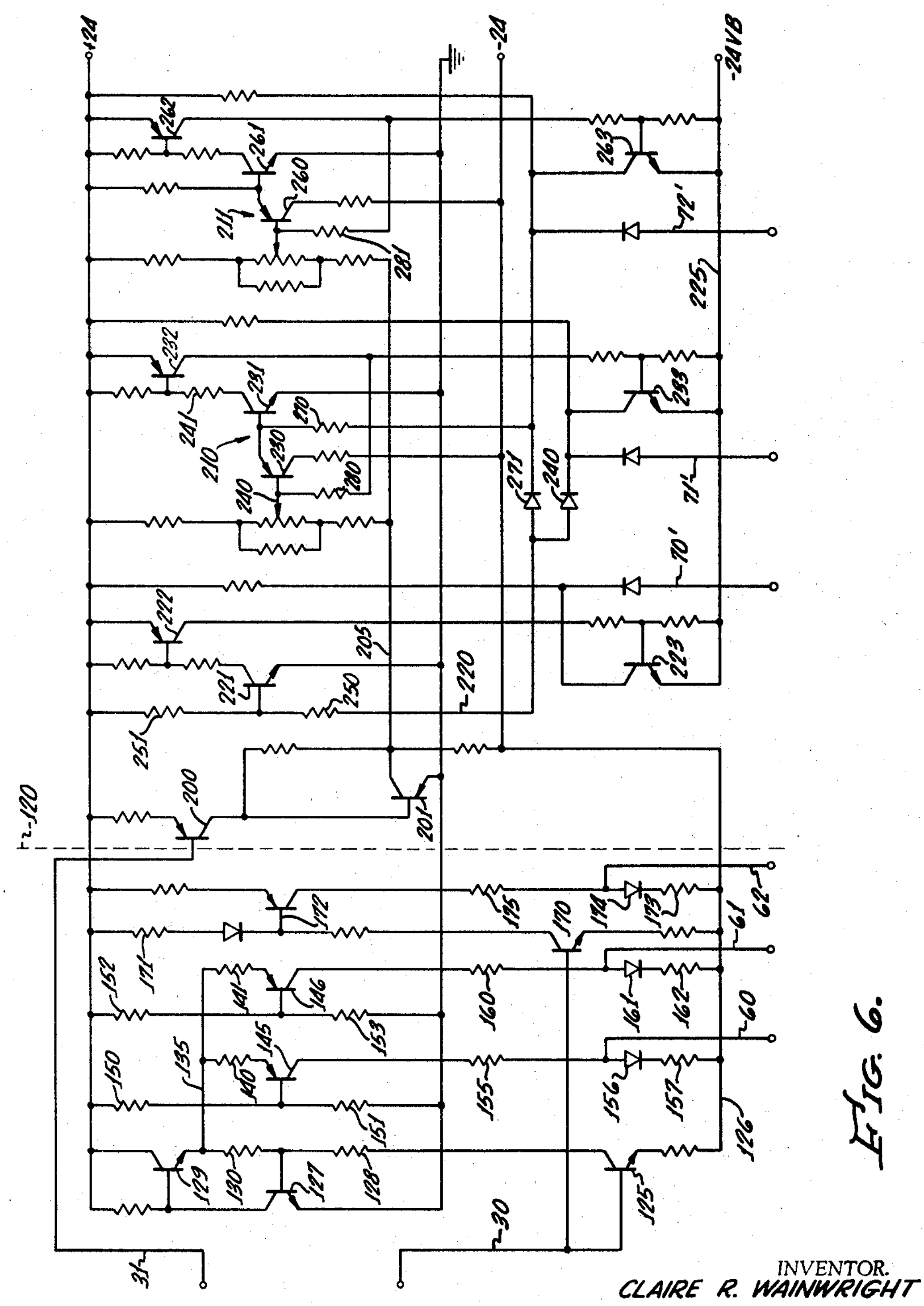
FIG. 6 is a detailed schematic of the drive processing and crossover switch stage of the system of FIG. 2.

Referring now to FIG. 6, the drive processing and the crossover switch control portions of stage 40 are located on respective left and right sides of dashed line 120. Ramp I is applied to the base of transistor 125 which produces a current at its collector electrode which is proportional to the voltage drop between its base electrode and the —24 volt bus 126. This collector current is coupled to the base of transistor 127 by resistor 128.

Transistor 127 and output transistor 129 provide a feedback amplifier which maintains the base of transistor 127 at virtual ground potential. This means that the voltage drop across resistor 130 is maintained proportional to the collector current of transistor 125 flowing through resistor 128. The potential level supplied bust 135 from the emitter of transistor 129 is thus proportional to the original input ramp I but translated to a potential level reference to ground potential.

Bus 135 is connected to resistors 140 and 141 which are respectively connected to the emitter electrodes of current generating transistors 145 and 146. These current generators each produce a current at their collector electrode which is proportional to the voltage drop between bus 135 and their respective base electrodes which are biased above ground by respective voltage divider networks comprising resistors 150, 151 and 152, 153. The collector current of transistor 145 is connected to the −24 volt bus 126 through series connected resistor 155, diode 156, and resistor 157. The output lead 60 which supplies the driver ramp 100 is connected to the common connection of resistor 155 and the anode of diode 156. Likewise, the collector of transistor 146 is connected to the −24 volt bus through series connected resistor 160, diode 161 and resistor 162, with the output 61 on which driver ramp 101 is produced being connected to the anode of diode 161.

Ramp I is also supplied to the base of transistor 170. The collector current of transistor 170 is proportional to the difference between the ramp voltage on lead 30 and the −24 volts applied to bus 126. This current develops a voltage across resistor 171 whose opposite end is connected to the +24 volt bus. This voltage in turn controls a current generating transistor 172. The current produced by this latter transistor develops a voltage drop across resistor 173 which is returned to the −24 volt bus. Output lead 62 is connected to the anode of diode 174 with the driver ramp 102 being supplied by the potential drop across resistor 173 plus the small voltage drop across diode 174.

The operation of the processor circuitry produces the respective ramps 100, 101, 102 as follows: at the initiation of the trace interval, the voltage level of ramp I is −14 volts which causes each of the current generating transistors 145, 146 and 172 to be turned full ON. Transistor 146 is then saturated by virtue of the voltage drop developed across resistor 160. Likewise, transistor 172 is saturated by the voltage drop across resistors 173 and 175. As a result, the output ramps 101 and 102 do not substantially exceed the −14 volt level as shown in FIGS. 4*c* and *d*; thereby preventing application of excessively high voltages and resultant power loses in the oscillators 51 and 52. As ramp I decreases to its first intermediate level $E_1'$ of −17 volts, the current through resistor 157 changes in a linear manner to provide the ramp 100. When input ramp I reaches intermediate level $E_1'$, the output voltage on 60 has reached its maximum magnitude of −23 volts. At (or preferably slightly above this level, i.e., between −22 and −23 volts), the second current source transistor 146 becomes unsaturated and provides a linear current through resistor 162 while ramp I decreases between the limits of $E_1'$ and $E_2'$. Similarly, at intermediate level $E_2'$, output ramp 101 reaches its minimum potential of −23 volts, and at (or preferably slightly above this level) the third current generating transistor 172 comes out of saturation and provides ramp 102 an output lead 62 until this ramp also reaches its minimum potential of −23 volts. Simultaneously, ramp I reaches its minimum level, also −23 volts, and the trace interval terminates.

Ramp II on input lead 31 is connected to the base of current generator transistor 200 whose collector current is coupled to the base of inverting transistor 201. The potential at the collector electrode of transistor 201 is a negative voltage referenced to ground and is connected to bus 205 which in turn controls switch control stages 210 and 211.

At the initiation of the trace interval, an inhibit potential is not present on lead 220 and transistor 221 is saturated. Saturation of this transistor likewise drives transistors 222 and 223 into saturation so as to effectively place the switch control lead 70' at approximately the potential of bus 225. This bus is connected to −24 volts during the trace interval and grounded during the blanking interval; accordingly, switch control lead 70' is held at −24 volts during any portion of each trace interval that transistor 221 is saturated to provide the switch control signal 90 of FIG. 3*d*.

As ramp II increases in potential, the current at the collector of transistor 200 decreases, resulting in a potential rise on bus 205, i.e., it becomes less negative. Switch control stage 210, comprising transistors 230, 231, 232 and 233, is initially turned off because of the reverse bias placed on the base of transistor 231 by transistor 230. However, as the potential on bus 205 increases, at a predetermined level of input ramp II selected by a potentiometer 240 (corresponding to intermediate potential level $E_1$ of FIGS. 3 and 5), transistor 231 begins to conduct. This causes a flow of collector current through resistor 241 to the base of transistor 232 which also conducts, supplying current to the base of transistor 233. The transistor 233 thus becomes saturated, thereby lowering its collector potential to approximately that of bus 225 or −24 volts and supplying this potential to output lead 71' as switch control signal 91 of FIG. 3*e*. Negative potential on the collector of transistor 233 is also coupled through the then forwardly biased diode 240 and lead 220 to one end of a voltage divider formed by resistors 250 and 251. The resultant negative inhibit voltage on the base of transistor 221 turns this transistor OFF, resulting in turn OFF also of transistors 222 and 223, and the grounding of output lead 70'. It will thus be seen that lead 70' is switched immediately to ground when 71' goes negative, as shown in FIG. 3.

As the input ramp II increases to the second intermediate potential $E_2$, the switch stage 211, comprising transistors 260, 261, 262 and 263, operates by virtue of the increased potential supplied to the emitter of transistor 261. This transistor, as well as transistors 262 and 263, saturates when ramp II reaches level $E_2$ and supplies −24 volts to output lead 72'. This voltage is supplied through resistor 270 to the base of transistor 231 causing this transistor to turn OFF and also through diode 271 to maintain the base of 221 below ground. As a result, both output leads 70' and 71' remain grounded when lead 72' is held at −24 volts.

Each of the switching stages 210 and 211 includes a respective feedback resistor 280 and 281. These have a relatively high impedance of the order of 27 megohm and serve to slightly reduce the intermediate switching potential $E_1$ for stage 210 and $E_2$ for stage 211, as described above and illustrated in FIG. 5. Thus, resistor 280 feeds back the voltage on the collector of transistor 232 to the base of transistor 230, serving to slightly increase the positive going excursion of the base of transistor 230 over and above that provided by the ramp on bus 205 which in turn is produced by input ramp II. This produces a regenerative effect which further increases the base voltage on transistor 231 and further moves transistor 232 into conduction. The net effect is to maintain 230, 231, 232 and 233 in saturation when the input ramp II does not decrease more than the offset $\Delta V$ below intermediate level $E_1$.

In like manner, feedback resistor 281 provides the net effect of supplying a small offset voltage $\Delta V'$ so that transistors 260, 261, 262 and 263 remain in saturation when the input ramp II does not decrease more than the offset $\Delta V'$ below intermediate level $E_2$. Hence, the oscillators 51 and 52 are available for supplying somewhat extended frequency ranges below their normal range when the lower frequency $f_1$ does not extend beyond this extended range.

Figure 7:
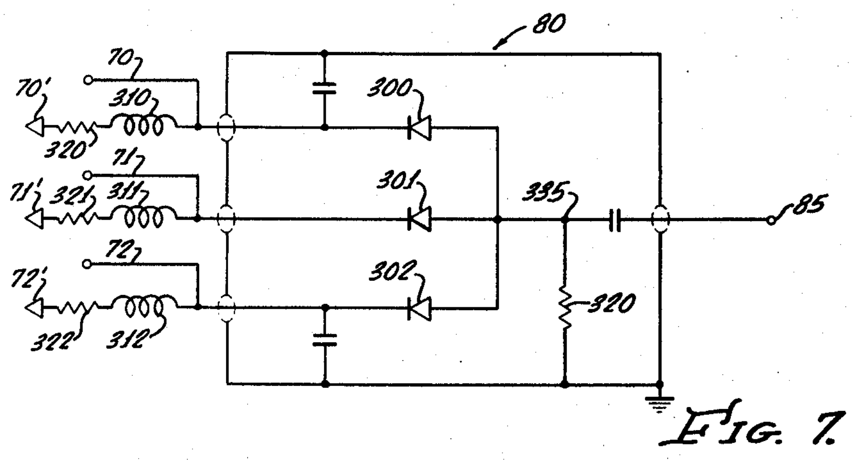
FIG. 7 is a detailed schematic of the RF switch of the system of FIG. 2.

Referring now to FIG. 7, RF switch 80 comprises a plurality of diodes 300, 301 and 302, having their cathodes connected to respective ones of the input leads 70, 71 and 72, and their anodes connected to the output terminal 85. In addition, each of the anode electrodes are respectively connected to output leads 70', 71' and 72' through a respective series connected inductance 310, 311, 312 and a respective resistor 320, 321, 322. The inductors 310–312 provide an effective open circuit for the RF energy supplied to the RF switch so that the oscillators are not loaded by the switch control circuitry of stage 40. Resistors 320–322 and resistor 330 form a voltage divider for the −24 volts supplied by the respective switch control signals 90, 91 and 92. For example, the values of these resistors may be equal, thus providing a 12-volt drop across resistor 330 an thereby maintaining node 335 at −12 volts. Accordingly, those pairs of input leads 70′, 71′; 70′, 72′; or 71′, 72′ which are grounded are therefore decoupled from the output terminal 85 by a reversed pair of diodes and only that one of the input leads which is connected to −24 forwardly bias its respective diode path so that the RF energy from the associated oscillator is coupled to output terminal 85. For example, during the initial portion of each trace interval, lead 70 is held at −24 volts and leads 71 and 72 are grounded. Diodes 301 and 302 are then reverse biased effectively decoupling oscillators 51 and 52 from output terminal 85 whereas diode 300 is then forwardly biased and the frequency output from oscillator 50 is coupled to output terminal 85.

I claim:

1. A sweep generator having an extended frequency bandwidth $\Delta f$ output between a first frequency $f_1$ and a second frequency $f_2$ comprising a plurality of variable oscillators respectively operable over bandwidths $\Delta f_1, \Delta f_2 \ldots \Delta f_n$, the sum of said respective bandwidths covering said sweep width $\Delta f$ and $f_1$ being encompassed by the lowest frequency oscillator and $f_2$ being encompassed by the highest frequency oscillator, means responsive to a time varying signal for sequentially producing a plurality of oscillator driver signals varying with time between first and second signal limits, said signals being successively initiated at said first limit when the immediately preceding signal reaches its second limit, means for respectively coupling said plurality of time varying oscillator driver signals to said plurality of variable oscillators, means responsive to said time varying signal for producing a plurality of time spaced switch control signals, and switch means responsive to said time spaced switch control signals for coupling in sequence the outputs of each of said variable oscillators to the output terminal of the sweep generator in synchronism with said oscillator driver signals.

2. A sweep generator having an extended frequency bandwidth comprising first and second variable oscillators respectively operable over bandwidths $\Delta f_1$ and $\Delta f_2$;

processor means for sequentially producing in time sequence a first oscillator driver signal and first switch control signals and a second oscillator driver signal and second switch control signal;

means for coupling said first and second oscillator driver signals to said first and second variable oscillators, respectively; and switch means responsively coupled to said switch control signals for coupling in sequence the outputs of said first and second oscillators to the output terminal of the sweep generator.

3. The sweep generator according to claim 2 comprising:

control means for coupling all or a selected portion of an input time varying signal to said processor means to correspondingly varying the bandwidth of the variable frequency signal applied to the output terminal of said sweep generator so as to encompass selected portions of either or both of the bandwidths $\Delta f_1$ and $\Delta f_2$.

4. The sweep generator according to claim 3 wherein:

said control means comprises means for coupling a time varying signal to a pair of potentiometers so that one of said potentiometers selectively varies the minimum frequency $f_1$, and the second potentiometer selectively varies the maximum frequency $f_2$ of the sweep width, or the first and second potentiometers, respectively, select the center frequency $f_c$ and the sweep bandwidth $\Delta f$.

5. The sweep generator according to claim 4, wherein:

said means for coupling said potentiometers to said time varying signal comprises a switch having a first position in which (i) one of the fixed terminals of said first potentiometer is connected to the time varying waveform and its other fixed terminal is connected to a potential corresponding to the maximum frequency output and (ii) one of the fixed terminals of said second potentiometer is connected to said time varying waveform and its other fixed terminal is connected to a potential level corresponding to the minimum frequency output, said switch having a second position wherein (i) one of said potentiometers is connected between said first and second voltage levels for providing a variable direct DC voltage at its movable contact for varying the center frequency $f_c$ and (ii) the other potentiometer has its fixed terminals connected to said input time varying waveform for providing a selected portion of said waveform at its movable contact for varying the sweep bandwidth $\Delta f$.

6. The sweep generator according to claim 2 wherein:

said processor means is responsive to an input linear ramp and produces in response thereto first and second oscillator driver signals in time sequence, each comprising a linear output ramp.

7. The sweep generator according to claim 2 wherein:

said processor means is responsive to an input linear ramp for producing first and second switch control signals, each of said control signals comprising a first voltage level for providing a conductive path through said switch means for one of said oscillators and a second voltage level for uncoupling said conductive path.

8. The sweep generator according to claim 6, wherein:

means are provided for producing first and second linearly varying ramps from said input linear ramp, the first of said output ramps being used for producing said oscillator driver ramps and the second of said output ramps being used to produce said switch control signals.

9. The sweep generator according to claim 6 wherein:

said first oscillator driver signal is a linear ramp signal varying between first and second limits produced in response to a predetermined first segment of said input linear ramp and said second oscillator driver signal is a linear ramp signal varying between first and second limits produced in response to a predetermined second segment of said input linear ramp, said second segment being substantially immediately adjacent said first segment so that said second ramp is initiated at its first limit when said first ramp reaches its second limit.

10. The sweep generator according to claim 9 wherein:

said means for producing said oscillator driver ramp signals comprise first and second current generators for respectively producing a flow of current directly proportional to the first and second segments of said input ramp.

11. The sweep generator according to claim 10 wherein:

at least one of said current generators is saturated during the interval that said input ramp exceeds the linear operating region of said one current generator so as to limit the magnitude of the oscillator driver signal produced by said one current generator.

12. The sweep generator according to claim 10 wherein:
at least one of said current generators and its associated oscillator has a linear operating region extending beyond the normal operating region.

13. The sweep generator according to claim 7 wherein:
said first switch control signal provides said first voltage level and corresponding conduction path in response to a predetermined first segment of said input linear ramp and said second voltage level corresponding to the uncoupling of said conductive path during the remainder of said ramp, and
said second switch control signal provides said first voltage level and corresponding conductive path in response to a predetermined second segment of said input linear ramp and said second voltage level corresponding to the uncoupling of said conductive path during the remainder of said ramp.

14. The sweep generator according to claim 13 wherein:
said processor means for producing said switch control signals includes first and second stages, one of said stages being saturated during said first segment of said input linear sweep and the other of said stages being cut off until said time varying input signal reaches a first intermediate level, at which level said second stage becomes saturated.

15. The sweep generator according to claim 14 wherein:
said means for producing said switch control signals further includes means for inhibiting operation of said first stage when said second stage becomes saturated.

16. The sweep generator according to claim 15 wherein:
said inhibitit means comprises a diode responsive to the switch control signal produced by said second stage, said diode being forwardly biased to apply an inhibit bias potential to said first stage.

17. The sweep generator according to claim 2 wherein:
said processor means for producing said switch control signals retains one of said oscillators coupled to said output terminal within a predetermined range of frequencies beyond its normal frequency range when one end of the selected sweep width does not extend beyond said predetermined range of frequencies.

18. The sweep generator according to claim 2 wherein:
said processor means is responsively coupled to an input linear ramp waveform, said processor means including oscillator retaining means for retaining one of said oscillators coupled to said output terminal within a predetermined range of frequencies beyond its normal frequency range when one end of the selected sweep width does not extend beyond said predetermined range of frequencies,
said retaining means including means for regeneratively feeding back a portion of one of said switch control signals for effectively providing an offset potential level on said input ramp wherein said second oscillator remains coupled to said output terminal.

19. The sweep generator according to claim 2 wherein:
said switch control signals and said oscillator output signals are combined in said switch means, switch control signal coupling means being provided for coupling said respective switch control signals to said switch means for preventing the oscillator output signals from passing therethrough.

20. The sweep generator according to claim 2 wherein:
said switch control signal coupling means comprise first and second inductors.

21. The sweep generator according to claim 2 wherein:
said switch means comprises a first diode responsively coupled to said first switch control signal and the output of said first oscillator and a second diode responsively coupled to said second switch control signal and the output of said second oscillator,
means coupling one electrode of each of said diodes to the output terminal of said sweep generator, each of said first and second switch control signals having a first level wherein said diode is reverse biased for uncoupling the associated oscillator from said output terminal and a second level wherein said diode is forwardly biased for coupling the associated oscillator to said output terminal.

22. A sweep generator having an extended frequency bandwidth comprising:
a first variable oscillator operable between a frequency $f_1$ and a frequency $f_3$,
a second variable oscillator operable between a frequency $f_2$ and a frequency $f_4$, where frequency $f_2$ is below frequency $f_3$ so that the respective bandwidths of the first and second oscillators overlap,
means responsive to an input time varying waveform for sequentially producing a first oscillator driver signal varying with time between the levels $V_a$ and $V_b$ and a second oscillator driver signal varying with time between the levels $V_a'$ and $V_b'$, said second signal being initiated at level $V_a'$ approximately at the same point on said input time varying waveform that said first signal reaches level $V_b$,
means for operatively coupling said first oscillator driver signal to said first variable oscillator and said second oscillator driver signal to said second variable oscillator,
switch control means responsive to said input time varying waveform for producing a first switching signal coincident with the production of said first oscillator driver signal and a second switching signal coincident with the production of said second oscillator driver signal, and
switch means coupled to the outputs of said first and second variable oscillators and said switch control means for coupling the output of said first oscillator to the output terminal of said sweep generator in response to said first switching signal and coupling the output of said second oscillator to said output terminal in response to said second switching signal.

23. A sweep generator having an extended frequency bandwidth comprising
a first variable oscillator responsive to a time varying oscillator driver waveform for providing an output signal which varies in frequency in accordance with the amplitude of said driver waveform, said oscillator providing a frequency $f_0$ when said waveform has an amplitude $E_0$ and a frequency $f_2$ when said waveform has an amplitude $E_1$,
a second variable oscillator responsive to said time varying waveform for providing an output signal which varies in accordance with the amplitude of said waveform, said oscillator providing a frequency $f_1$ when said waveform has an amplitude $E_1$, said frequency $f_1$ being between $f_0$ and $f_2$ so that the respective frequency ranges of said first and second oscillators overlap,
means responsive to said time varying waveform for producing a control signal for selectively switching one of said oscillators to the sweep generator output, said means providing a control signal coincident with waveform amplitude $E_1$ for switching from the second oscillator to the first oscillator when said waveform extends below $E_1$ an amount greater than a predetermined value $\Delta E$ and does not switch from the second oscillator to the first oscillator when said waveform extends below $E_1$ an amount equal to or less than said predetermined value $\Delta E$, said second oscillator being used in said latter instance to provide a range of frequencies beyond its normal frequency limit $f_1$.

24. In a sweep generator, a variable oscillator responsive to a time varying driver waveform for providing an output signal on the outut terminal of said sweep generator which varies in frequency in accordance with the amplitude of said driver waveform, control means for coupling all or a selected portion of said time varying driver waveform to correspondingly vary the bandwidth of the variable frequency signal applied to the output terminal of said sweep generator, said control means comprising means for coupling a time varying driver waveform to a pair of potentiometers so that (i) one of said potentiometers selectively varies the minimum frequency $f_1$, and the second potentiometer selectively varies the maximum frequency $f_2$ of the sweep width, or (ii) the first and second potentiometers, respectively, select the center frequency $f_c$ and the sweep bandwidth $\Delta f$.

25. In the sweep generator as defined in claim 24, said means for coupling said potentiometers to said time varying driver waveform comprises a switch having a first position in which (i) one of the fixed terminals of said first potentiometer is connected to the time varying waveform and its other fixed terminal is connected to a potential corresponding to the maximum frequency output and (ii) one of the fixed terminals of said second potentiometer is connected to said time varying waveform and its other fixed terminal is connected to a potential level corresponding to the minimum frequency output, said switch having a second position wherein (i) one of said potentiometers is connected between said first and second voltage levels for providing a variable DC voltage at its movable contact for varying the center frequency $f_c$ and (ii) the other potentiometer has its fixed terminals connected to said input time varying waveform for providing a selected portion of said waveform at its movable contact for varying the sweep bandwidth $\Delta f$.

No references cited.

ROY LAKE, *Primary Examiner.*

S. H. GRIMM, *Assistant Examiner.*